(12) United States Patent
Dictos

(10) Patent No.: US 10,333,709 B2
(45) Date of Patent: Jun. 25, 2019

(54) METHOD AND APPARATUS TO SUPPORT BINARY PACKING OF JSON DATA

(71) Applicant: BARRACUDA NETWORKS, INC., Campbell, CA (US)

(72) Inventor: Jason D. Dictos, Fresno, CA (US)

(73) Assignee: Barracuda Networks, Inc., Campbell, CA (US)

( * ) Notice: Subject to any disclaimer, the term of this patent is extended or adjusted under 35 U.S.C. 154(b) by 386 days.

(21) Appl. No.: 15/377,178

(22) Filed: Dec. 13, 2016

(65) Prior Publication Data

US 2017/0310671 A1    Oct. 26, 2017

Related U.S. Application Data

(60) Provisional application No. 62/327,411, filed on Apr. 25, 2016.

(51) Int. Cl.
*H04L 29/06* (2006.01)
*H04L 9/08* (2006.01)
*H04L 29/08* (2006.01)

(52) U.S. Cl.
CPC ........ *H04L 9/0894* (2013.01); *H04L 67/1097* (2013.01)

(58) Field of Classification Search
CPC .............. H04L 9/0894; H04L 67/1097; H04L 63/0428; H04L 67/42
USPC ........................................................ 713/153
See application file for complete search history.

(56) References Cited

U.S. PATENT DOCUMENTS

| 2006/0215701 | A1* | 9/2006 | Fenelon | H04L 67/02 370/474 |
| 2015/0052256 | A1* | 2/2015 | Fenstad | H04L 67/40 709/227 |
| 2015/0229613 | A1* | 8/2015 | Baum | G06F 16/00 713/171 |

* cited by examiner

Primary Examiner — Yogesh Paliwal

(57) ABSTRACT

A new approach is proposed that contemplates systems and methods to support packing of both binary data and fields of non-binary logical data (e.g., JSON) into a payload, which is then transmitted by a client to a cloud-based storage or a web server over a communication network. Here, the payload is designed for the packing binary data with the non-binary data fields that preserves backwards compatibility with all types of clients of the data without any limitation on the data format supported by the clients. As such, the packing of binary data with data fields of the non-binary logical request data allows both simple text-based parsing and binary data to co-exist where both binary and string data can be included in the payload.

30 Claims, 4 Drawing Sheets

300 ⟶

```
┌─────────────────────────────────────────────────────────────┐
│ Compose a payload of data at a first host, wherein the payload │
│ includes both a non-binary data portion and a binary data portion │
│                      of the data                             │
│                         302                                  │
└─────────────────────────────────────────────────────────────┘
                              │
                              ▼
┌─────────────────────────────────────────────────────────────┐
│ Encode one or more keys in the non-binary data portion of the │
│ payload, wherein each key is a simple text string with a unique │
│ meaning for both the first host that sends the data and a second │
│       host that receives the payload of the data             │
│                         304                                  │
└─────────────────────────────────────────────────────────────┘
                              │
                              ▼
┌─────────────────────────────────────────────────────────────┐
│  Transmit the payload packed with both the non-binary data   │
│    portion and a binary data portion to the second host      │
│                         306                                  │
└─────────────────────────────────────────────────────────────┘
                              │
                              ▼
┌─────────────────────────────────────────────────────────────┐
│ Decode and retrieve the keys from the non-binary data portion of │
│   the payload upon receiving the payload from the first host │
│                         308                                  │
└─────────────────────────────────────────────────────────────┘
                              │
                              ▼
┌─────────────────────────────────────────────────────────────┐
│ Look up at the offset in the binary data portion of the payload as │
│   pointed to by the keys to retrieve the binary data sections for │
│                      further processing                      │
│                         310                                  │
└─────────────────────────────────────────────────────────────┘
```

FIG. 3

METHOD AND APPARATUS TO SUPPORT BINARY PACKING OF JSON DATA

CROSS-REFERENCE TO RELATED APPLICATIONS

This application claims the benefit of U.S. Provisional Patent Application No. 62/327,411, filed Apr. 25, 2016, and entitled "Binary packing of JSON data fields," which is incorporated herein in its entirety by reference.

BACKGROUND

For corporations having a large amount of storage needs for their data and files, the data and files are increasingly being stored in cloud storages these days. When sending the data to the cloud storage over a network (through network sockets), efficient packing or encoding of the data (e.g., binary packing of the data) is desired in order to reduce burden on the communication bandwidth between the local host of the clients and the cloud storage. In the meantime, simple non-binary encoding of at least a portion of the data is also important for preserving backwards compatibility with the clients of the data/files.

JavaScript Object Notation (JSON) is an open-standard language-independent data format that uses non-binary human-readable text to transmit data objects (payload) comprising logical data in the form of attribute-value pairs over a network. JSON is commonly used for asynchronous communication between a local client and a server. Binary JSON (BJSON) is another format with extensions to allow both binary and string data to be serialized and encoded in the payload. Since BJSON drastically changes the format of the payload to include additional data types that are not part of the JSON format, it cannot be used by client devices/hosts that support JSON only. It is thus desirable to have a data packing approach that supports both efficient and non-binary encoding of data for data transmission between the clients and the cloud storage or server without imposing any special restrictions or requirements on the software and/or the data formats supported by the clients.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts a flowchart of an example of a process to support binary packing of JSON data in accordance with some embodiments.

DETAILED DESCRIPTION OF EMBODIMENTS

Figure 1:
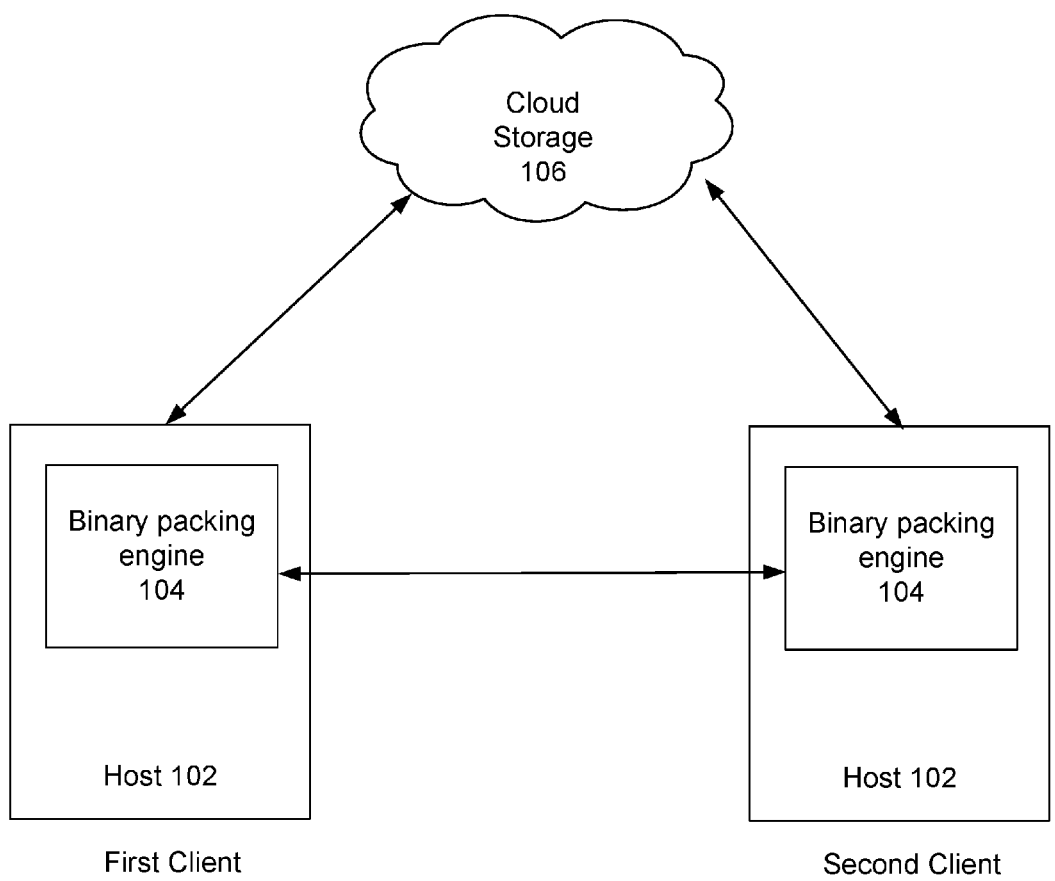
FIG. 1 depicts an example of a system diagram to support binary packing of JSON data in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support packing of both binary data and fields of non-binary logical data (e.g., JSON) into a payload, which is then transmitted by a client to a cloud-based storage or a web server over a communication network. Here, the payload is designed for the packing binary data with the non-binary data fields that preserves backwards compatibility with all types of clients of the data without any limitation on the data format supported by the clients. As such, the packing of binary data with data fields of the non-binary logical request data allows both simple text-based parsing and binary data to co-exist where both binary and string data can be included in the payload.

Under the proposed approach, the client can communicate easily with the cloud-based storage and/or the web server in non-binary scripting language using a well-known logical data format such as JSON, while such communication can still be performed with packing of binary data, which enables the client to efficiently send the binary data to and receive the binary data from the cloud-based storage and/or the web server. As such, the client no longer needs to convert data blobs to encoded strings (e.g., in base64 format) as is typically required for sending data via traditional JSON Application Program Interfaces (APIs).

Although JSON is used as a non-limiting example of non-binary logical data format in the following discussions, a person ordinarily skilled in the art would have understood that the same approach can also be applied to other types of non-binary logical data format without modification.

FIG. 1 depicts an example of a system diagram 100 to support binary packing of JSON data. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more binary packing engines 104 each running on a host 102 of a client, and a cloud storage 106. Here, the host 102 can be a computing device, a communication device, a storage device, or any electronic device capable of running a software component and communicating with the cloud storage 106. For non-limiting examples, a computing device can be but is not limited to a laptop PC, a desktop PC, an iPod, an iPhone, an iPad, a Google's Android device, or a server/host/machine. A storage device can be but is not limited to a hard disk drive, a flash memory drive, or any portable storage device.

In some embodiments, the host 102 reside either locally or remotely (e.g., over a network) from the cloud storage 106. The host 102 has at least one communication interface (not shown), which enables the binary packing engine 104 running on the host 102 to communicate with the cloud storage 106 and/or other hosts following certain communication protocols, such as TCP/IP, http, https, ftp, and sftp protocols, over one or more communication networks (not shown). The communication networks can be but are not limited to, Internet, intranet, wide area network (WAN), local area network (LAN), wireless network, Bluetooth, WiFi, and mobile communication network. The physical connections of the network and the communication protocols are well known to those of skill in the art.

In the example of FIG. 1, the cloud storage 106 in FIG. 1 includes a plurality of storage and/or web servers configured to receive, store and/or process the data and files for the clients of the hosts 102 remotely in the cloud (on the Internet) at geographically distributed locations different from the locations of the hosts 102 of the binary packing engines 104. In some embodiments, the cloud storage 106 further maintains information (such as the metadata) of the files of the clients in the cloud.

Figure 2A:
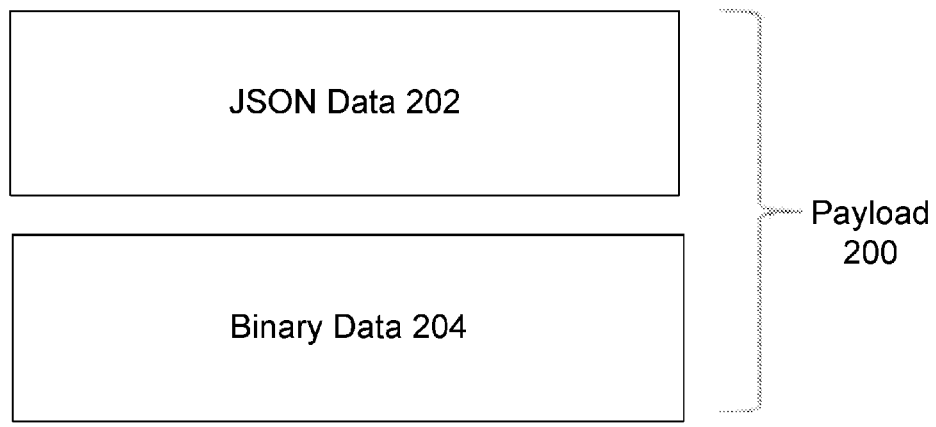
FIGS. 2(a)-(c) depict examples of various portions of a payload under binary packing of JSON data in accordance with some embodiments.

In the example of FIG. 1, the binary packing engine 104 is configured to compose a payload 200 of data of a first client with packing of both binary and non-binary data before transmitting the payload to the cloud storage 106 or another client. Here, the payload includes two portions: non-binary data portion 202 in, for a non-limiting example, JSON format, and binary data portion 204 as shown by the example of FIG. 2(a). The size of the payload equals to the total size of the non-binary data portion 202 plus the binary data portion 204. Note that since decoding of the non-binary data portion 202 of the payload 200 by the cloud storage 106 or a web server ends when a properly formatted string with a terminating null at the end of the non-binary data portion 202 is detected, including additional (binary) data 204 in the payload 200 following the end of the non-binary data portion 202 does not interfere with decoding of the non-binary data portion 202.

Figure 2B:
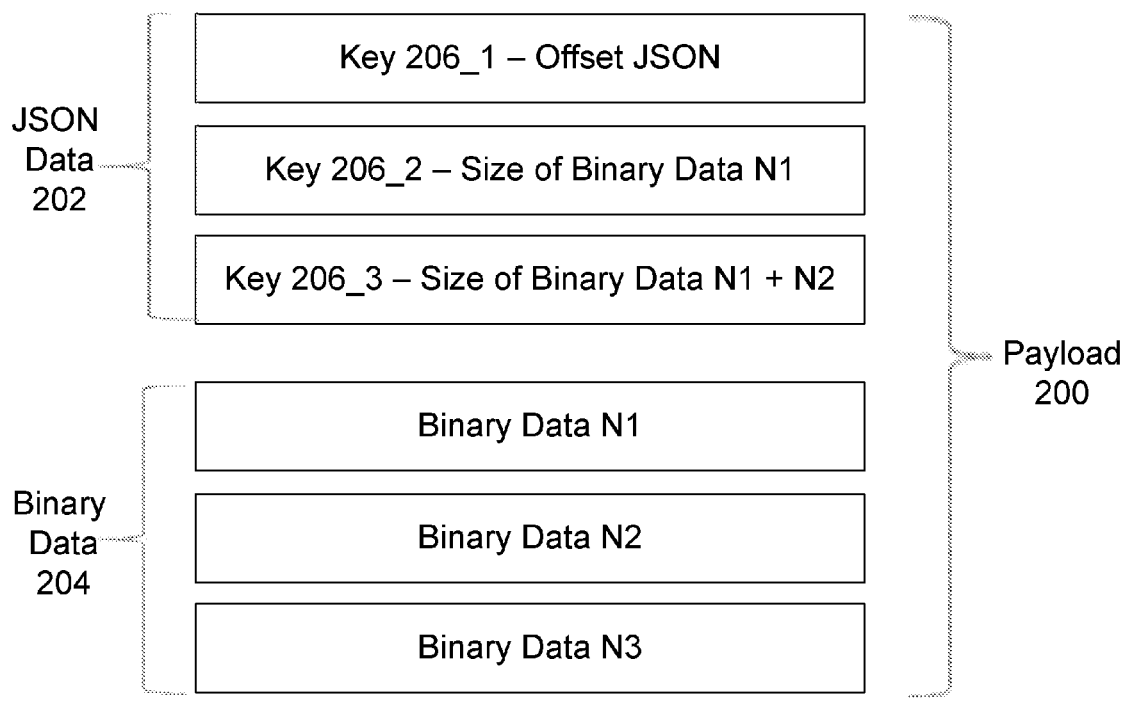

In some embodiments, the binary data portion 204 of the payload 200 includes one or more binary data sections at appropriate offsets, e.g., Binary Data N1, N2, and N3, which together represent the complete binary data portion 204 as shown by the example in FIG. 2(b). Each of the binary data sections is a chunk of binary data and can be represented by a unique identifying hash value (e.g., MD5-SHA1-SIZE). No two similar binary data sections are redundantly stored in the cloud storage 106 so that all data/files stored in the cloud are de-duplicated. In some embodiments, all binary data sections in the binary data portion 204 have the same size (e.g., 1 MB) by convention. In some embodiments, however, the binary data sections can be of various sizes, if the data of the first client to be sent to the cloud storage 106 is known to be of large size to speed up the combination and rehashing them of the binary data sections.

In some embodiments, the binary packing engine 104 is configured to encode one or more special keys 206 in the non-binary data portion 202 of the payload 200 before sending the payload of the JSON data with the binary data to the cloud storage 106 or the web server. Here, the keys 206 indicate where in the payload the binary data sections reside. In some embodiments, each key 206 is a simple string with a unique meaning for both the first client who sends the data via the binary packing engine 104 of the first host 102 and a second client who receives and decodes the payload of the client data via the binary packing engine 104 of the second host 102. In the example of FIG. 2(b), there are multiple keys 206 in the non-binary data portion 202, wherein the keys 206 specify at which offset after the end of the non-binary data portion 202 (e.g., the terminating null character) each binary data section resides. As shown in the example of FIG. 2(b), key 206_1 indicates that Binary Data N1 starts immediately following the end of end of the non-binary data portion 202, key 206_2 indicates that Binary Data N2 starts at an offset of size of the Binary Data N1 following the end of the non-binary data portion 202, and key 206_3 indicates that Binary Data N3 starts at an offset of size of the Binary Data N1+N2 following the end of the non-binary data portion 202.

In the example of FIG. 1, the format of the payload 200 including both the non-binary data portion 202 and the binary data portion 204 is negotiated between the binary packing engine 104 of the first client that encodes and sends the payload, and the binary packing engine 104 of the cloud storage 106 that stores the payload, and/or a second client that receives the payload (either from the cloud storage 106 or directly from the first client) and decodes it. As such, upon receiving the payload sent by the binary packing engine 104 running on a first host 102 associated with the first client, either directly or from the cloud storage 106, the binary packing engine 104 running on a second host 102 associated with the second client is configured to decode and retrieve keys 206 from the non-binary data portion 202 of the payload 200 and lookup at the proper offset in the binary data portion 204 of the payload 200 as pointed to by the keys to retrieve the binary data sections for further processing. Since the binary data portion 204 is independent from and has no adherence to the non-binary data portion 202 in string format, in some embodiments, the binary data portion 204 can be optionally compressed and/or further encrypted the binary packing engine 104 running on the first host 102 and later uncompressed and/or decrypted by the binary packing engine 104 running on the second host 102.

In some embodiments, the first host 102 is a client device, and second host 102 is a web server, wherein the binary packing engines 104 on the first host 102 and the second host 102 are implemented in such a way that both share the same understanding on the format of the payload 200 including the non-binary data portion 202 and the binary data portion 204 for encoding and decoding of the payload for client-web server interactions.

Figure 2C:
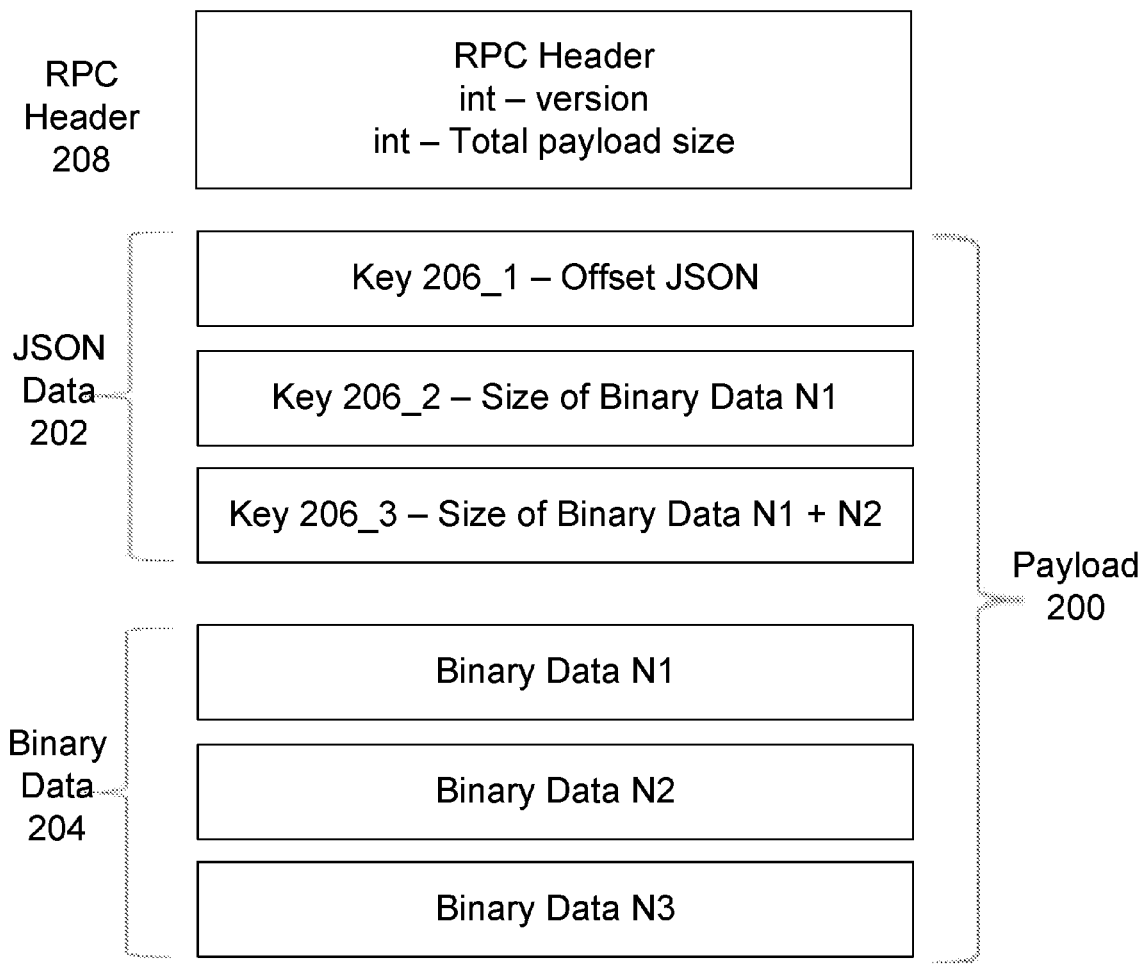

In some embodiments, the binary packing engines 104 on the first host 102 and the second host 102 are configured to adopt a Remote Procedure Call (RPC) header portion 208 in the payload 200 for client-web server interactions as shown in the example of FIG. 2(c). Here, RPC a protocol that a client can use to request a service from a server located on another host over a network without including details of the communication network. The RPC header portion 208 in the payload identifies which server(s) and client(s) do or do not support the payload format that includes both the non-binary data portion 202 and the binary data portion 204 via a version field (e.g., integer type). A client that does not handle such format client-web server interactions defers to JSON safe encoding of the data (e.g., Base64 or otherwise). If an unknown version is specified in a payload of a request sent by a client, the binary packing engine 104 on the server will reject the request in the payload, forcing the binary packing engine of the client to re-send the payload in the proper format. In some embodiments, the RPC header portion 208 further includes the total size of the payload 200.

In some embodiments, the payload 200 sent by the binary packing engine 104 on the first host 102 of the first client may transit through one or more network components, such as a firewall or a site security filter, and be modified without the client's knowledge. Even when the non-binary data portion 202 gets modified, the relative offsets as indicated by the keys 206 still correctly points to the binary data sections in the binary data portion 204. Should modification or truncation of the binary data portion 204 itself occur during transmission, the binary packing engine 104 on the second host 102 of the second client is configured to utilize sizes/offsets of the binary data sections as indicated by the keys 206 in the non-binary data portion 202 to validate integrity of the payload 200. In addition, if the sum of sizes of the binary data sections extracted from the payload 200 does not match the total size of the payload as described in the RPC header portion 208 and/or the keys 206 in the non-binary data portion 202, the binary packing engine 104 on the second host 102 would detect an error and the clients would defer to JSON safe encoding of the data for their interactions as a fallback.

FIG. 3 depicts a flowchart 300 of an example of a process to support binary packing of JSON data. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a payload of data is composed at a first host, wherein the payload includes both a non-binary data portion and a binary data portion of the data. The flowchart 300 continues to block 304, where one or more keys are encoded in the non-binary data portion of the payload, wherein each key is a simple text string with a unique meaning for both the first host that sends the data and a second host that receives the payload of the data. The flowchart 300 continues to block 306, where the payload packed with both the non-binary data portion and a binary data portion is transmitted to the second host. The flowchart 300 continues to block 308, where the keys are decoded and retrieved from the non-binary data portion of the payload upon receiving the payload from the first host. The flowchart 300 ends at block 310 where the offset in the binary data portion of the payload as pointed to by the keys are looked up to retrieve the binary data sections for further processing.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A computer-implemented system to support binary packing with non-binary data, comprising:
 a first host running a first binary packing engine configured to
  compose a payload of data, wherein the payload includes both a non-binary data portion and a binary data portion of the data;
  encode one or more keys in the non-binary data portion of the payload, wherein each key is a simple text string with a unique meaning for both the first host that sends the data and a second host that receives the payload of the data;
  transmit the payload packed with both the non-binary data portion and a binary data portion to the second host;
 said second host running a second binary packing engine configured to
  decode and retrieve the keys from the non-binary data portion of the payload upon receiving the payload from the first host;
  look up at the offset in the binary data portion of the payload as pointed to by the keys to retrieve one or more binary data sections for further processing.

2. The system of claim 1, wherein:
the non-binary data portion is in JavaScript Object Notation (JSON) format.

3. The system of claim 1, wherein:
the first host is a computing device associated with a client.

4. The system of claim 1, wherein:
the second host is a cloud-based storage or a web server.

5. The system of claim 1, wherein:
the binary data portion is independent from and has no adherence to the non-binary data portion of the payload.

6. The system of claim 1, wherein:
the second binary packing engine is configured to stop decoding the non-binary data portion of the payload when a properly formatted string with a terminating null at the end of the non-binary data portion is detected.

7. The system of claim 6, wherein:
including the binary data portion in the payload following the end of the non-binary data portion does not interfere with decoding of the non-binary data portion.

8. The system of claim 1, wherein:
the binary data portion includes said one or more binary data sections at appropriate offsets, wherein the binary data sections together represent the complete binary data portion.

9. The system of claim 8, wherein:
each of the binary data sections is a chunk of binary data and can be represented by a unique identifying hash value.

10. The system of claim 8, wherein:
the binary data sections are of various sizes.

11. The system of claim 8, wherein:
each of the keys specify at which offset after the end of the non-binary data portion each of the binary data sections resides.

12. The system of claim 11, wherein:
the offsets as indicated by the keys still correctly points to the binary data sections in the binary data portion even when the non-binary data portion gets modified during transmission.

13. The system of claim 11, wherein:
the second binary packing engine is configured to utilize the offsets of the binary data sections as indicated by the keys in the non-binary data portion to validate integrity of the payload if modification or truncation of the binary data portion itself occurs during transmission.

14. The system of claim 1, wherein:
format of the payload including both the non-binary data portion and the binary data portion is negotiated between the first binary packing engine of the first host that generates and sends the payload and the second binary packing engine of the second host that receives and decodes the payload.

15. The system of claim 1, wherein:
the binary packing engines on the first and the second host are configured to adopt a Remote Procedure Call (RPC) header portion in the payload for client-web server interactions, wherein the RPC header portion in the payload format identifies via a version field which server and client do or do not support the payload format that includes both the non-binary data portion and the binary data portion.

16. The system of claim 15, wherein:
the second binary packing engine is configured to reject the payload and force the first binary packing engine to re-send the payload in proper format if an unknown version is specified in the payload.

17. The system of claim 15, wherein:
the RPC header portion further includes total size of the payload.

18. The system of claim 17, wherein:
the second binary packing engine is configured to detect an error and defer to JSON safe encoding of the data for as a fallback for the client-web server interactions if sum of sizes of the binary data sections extracted from the payload does not match the total size of the payload as described in the RPC header portion and/or the keys in the non-binary data portion of the payload.

19. A computer-implemented method to support binary packing with non-binary data, comprising:

composing a payload of data at a first host, wherein the payload includes both a non-binary data portion and a binary data portion of the data;
encoding one or more keys in the non-binary data portion of the payload, wherein each key is a simple text string with a unique meaning for both the first host that sends the data and a second host that receives the payload of the data;
transmitting the payload packed with both the non-binary data portion and a binary data portion to the second host;
decoding and retrieving the keys from the non-binary data portion of the payload upon receiving the payload from the first host;
looking up at the offset in the binary data portion of the payload as pointed to by the keys to retrieve one or more binary data sections for further processing.

20. The method of claim 19, wherein:
the non-binary data portion is in JavaScript Object Notation (JSON) format.

21. The method of claim 19, wherein:
the binary data portion is independent from and has no adherence to the non-binary data portion of the payload.

22. The method of claim 19, further comprising:
stopping decoding the non-binary data portion of the payload when a properly formatted string with a terminating null at the end of the non-binary data portion is detected.

23. The method of claim 19, further comprising:
including said one or more binary data sections at appropriate offsets in the binary data portion, wherein the binary data sections together represent the complete binary data portion.

24. The method of claim 23, wherein:
each of the keys specify at which offset after the end of the non-binary data portion each of the binary data sections resides.

25. The method of claim 24, wherein:
the offsets as indicated by the keys still correctly points to the binary data sections in the binary data portion even when the non-binary data portion gets modified during transmission.

26. The method of claim 24, further comprising:
utilizing the offsets of the binary data sections as indicated by the keys in the non-binary data portion to validate integrity of the payload if modification or truncation of the binary data portion itself occurs during transmission.

27. The method of claim 19, further comprising:
negotiating format of the payload including both the non-binary data portion and the binary data portion is between the first host that generates and sends the payload and the second host that receives and decodes the payload.

28. The method of claim 19, further comprising:
adopting a Remote Procedure Call (RPC) header portion in the payload for client-web server interactions, wherein the RPC header portion in the payload format identifies via a version field which server and client do or do not support the payload format that includes both the non-binary data portion and the binary data portion.

29. The method of claim 28, further comprising:
rejecting the payload and force the first binary packing engine to re-send the payload in proper format if an unknown version is specified in the payload.

30. The method of claim 29, further comprising:
detecting an error and defer to JSON safe encoding of the data for as a fallback for the client-web server interactions if sum of sizes of the binary data sections extracted from the payload does not match total size of the payload as described in the RPC header portion and/or the keys in the non-binary data portion of the payload.

\* \* \* \* \*